United States Patent
Rudolph et al.

(10) Patent No.: US 6,921,872 B2
(45) Date of Patent: Jul. 26, 2005

(54) STEERING COLUMN SWITCH

(75) Inventors: Gerd Rudolph, Aspisheim (DE); Holger Besier, Oestrich-Winkel (DE)

(73) Assignee: Delphi Technologies, Inc., Troy, MI (US)

( * ) Notice: Subject to any disclaimer, the term of this patent is extended or adjusted under 35 U.S.C. 154(b) by 33 days.

(21) Appl. No.: 10/148,840

(22) PCT Filed: Dec. 1, 2000

(86) PCT No.: PCT/DE00/04306

§ 371 (c)(1),
(2), (4) Date: Sep. 27, 2002

(87) PCT Pub. No.: WO01/40019

PCT Pub. Date: Jun. 7, 2001

(65) Prior Publication Data

US 2003/0132091 A1 Jul. 17, 2003

(30) Foreign Application Priority Data

Dec. 4, 1999 (DE) .......................... 199 58 505

(51) Int. Cl.[7] .............................................. H01H 9/00
(52) U.S. Cl. .............................. 200/61.54; 200/61.27; 439/15
(58) Field of Search ......................... 200/61.54, 61.27, 200/61.34, 61.35, 61.3, 11 A, 17 R, 4; 439/15, 164

(56) References Cited

U.S. PATENT DOCUMENTS

| 623,004 | A | * | 4/1899 | Gillespie ...................... 278/81 |
| 4,929,806 | A | * | 5/1990 | Furuhashi et al. ....... 200/61.54 |
| 5,766,019 | A | * | 6/1998 | Matsumoto et al. .......... 439/15 |
| 5,804,782 | A | * | 9/1998 | Newman et al. ......... 200/61.27 |
| 5,883,348 | A | * | 3/1999 | Yokoyama ............... 200/61.54 |
| 5,977,495 | A | | 11/1999 | Akimoto |
| 6,365,852 | B1 | | 4/2002 | Leng et al. |
| 6,472,622 | B1 | | 10/2002 | Besier |
| 6,492,744 | B1 | | 12/2002 | Rudolph et al. |
| 6,501,034 | B2 | * | 12/2002 | Sugata .................... 200/61.54 |

FOREIGN PATENT DOCUMENTS

| DE | 2721879 | 11/1978 |
| DE | 3433451 | 2/1986 |
| DE | 4305827 | 9/1994 |
| DE | 19801526 | 7/1998 |

* cited by examiner

Primary Examiner—Kyung Lee
(74) Attorney, Agent, or Firm—David P. Wood

(57) ABSTRACT

A steering column switch of a motor vehicle having a blinker switch and a wiper/washer switch in a common housing wherein the switches share an identical design thereby reducing manufacturing, and handling, and stocking costs.

16 Claims, 4 Drawing Sheets

STEERING COLUMN SWITCH

TECHNICAL FIELD

The invention generally relates to electrical switches and more particularly relates to a steering column switch of a motor vehicle.

BACKGROUND OF THE INVENTION

From DE-C-27 21 879, a steering column switch with a keyed blinker switch is known, whose switch lever for change-of-lane blinking or for direction indication to the right and to the left acts successively on one or two correlated keying switches. The switching state of the blinker switch is stored by means of an electronic holding device and the holding device is reset by means of an electronic resetting device. The switch lever is reset to a neutral position automatically, after its actuation, by a spring-loaded connecting bridge. This switch is used only as a blinker switch because of its limited functions and its limited moving capacity.

Furthermore, wiper/washer switches for motor vehicles are known, whose switch levers for the front wiper functions are supported in a housing in such a way that they can swivel clockwise and counter-clockwise and for the front/washer and rear wiper/washer functions, the switch levers are supported so that they can swivel in and contrary to the direction of a dashboard. The switch functions can be carried out mechanically locking and keyed.

Each of the previously explained switches has specific features with regard to its mechanics, which make their separate manufacturing necessary. In addition to a high manufacturing expense, the existence of these different switches also involves a high logistical expense with separate storage and separate handling during assembly. Furthermore, it is necessary to produce correspondingly different switches for motor vehicles steered on the right and on the left side.

Moreover, U.S. Pat. No. 5,977,495 discloses a steering column switch for a motor vehicle with two switches with separate switch housings inserted into one housing, wherein the two switches have the same construction. In each switch housing, a switch lever is supported by a universal joint. The switch lever has switching contacts for action of stationary contacts on the switch housing side and can be locked at least in its upper and lower switching positions.

It is the goal of the invention to produce a steering column switch of the type mentioned in the beginning, whose blinker and wiper/washer switches can be mutually exchanged, wherein the steering column switch can be manufactured at low cost due to a limited number of units.

In accordance with the invention, the goal is attained in that the switch lever, the rotating switching element and sliding switching element, the carrier, and the locking devices of each switch are designed identically, and the carrier is essentially in the shape of a Z, wherein the leg facing the switch lever is used to guide the sliding switching element; the other leg is inserted into the housing and the bridge connecting the legs supports the rotating switching element.

As a result of these measures, identical switch mechanics are available for the two switches, which can be produced in a correspondingly large number of units at a low cost. Also during the storage and assembly of the switches, they need not be separated according to their functions. Moreover, this ensures that different switches for motor vehicles steered on the left or right sides need not be manufactured and assembled. The switching functions are assigned to the switches with the identical switch mechanics in a so-called final assembly programming of the vehicle electronics. Moreover, the carrier represents an essential component to hold the sliding switching element and the rotating switching element. With the correlated switching elements, the carrier forms an assembly independent of the steering column switch, which can be assembled separately and if needed, can be replaced in a relatively simple manner.

In order to secure an initial position of the switch lever, which is supported by a universal joint, and to ensure a desired switching feel when it is actuated, the carrier leg, which guides the sliding switching element, holds, in the middle, two spring-loaded, locking sleeves of the locking devices, which are above one another, wherein the upper locking sleeve works together with a locking curve in the foot of the switch lever and the lower locking sleeve, with a locking curve of the rotating switching element. Appropriately, each locking curve is designed in the shape of a V.

For the support of the switch lever with a universal joint and the execution of the related switching functions, the rotating switching element is constructed in the form of an L, wherein the switch lever is set into the short leg in such a way that it can move by swiveling, and the long leg is supported in the carrier. Thus, the arrangement of additional supports for the switch lever are dispensed with, since corresponding support sites are integrated in the rotating switching element.

According to an advantageous embodiment of the present invention, the long leg of the rotating switching element has switching contacts, designed as contact springs, for the contacting of correlated contact tracks of the bridge of the carrier. The long leg of the rotating switching element is preferably provided with a recess into which the contact springs protrude. The contact springs are a component of a pressed screen, which is admitted into the rotating switching element. The manufacturing of the rotating switching element takes place with an injection molding method, in which the pressed screen is simultaneously injected, so that an additional assembly step is dispensed with.

Appropriately, the contact springs are affixed on one side of the recess and provided, at their free ends, with a V-shaped bend, whose tip acts on the correlated contact track. This development secures a linear contacting of the corresponding contact track, wherein the tip of the contact springs lies, prestressed, on the contact track.

According to an advantageous alternative refinement of the idea of the invention, an actuation device for the switching contacts, designed as microswitches, is connected with the long leg of the rotating switching element; the contacts are situated on the bridge of the carrier. The microswitch offers the advantage of an exact switching point, which is reached via the actuation device. To carry out various switching operations, either a corresponding programming of the vehicle electronics or the arrangement of a corresponding number of microswitches is necessary.

The actuation device preferably comprises two spring arms for action on a microswitch, wherein the free end of each spring arm carries a boss, which works together with switching bosses of the rotating switching element. The actuation device secures a path-dependent action of the microswitches, in an interplay with the switching bosses of the rotating switching element. The signal of the first actuated microswitch is stored by the vehicle electronics and after the subsequent setting of a second signal, a switching operation is clearly identified by the vehicle electronics. After the storage of the second signal, other signals are stored by the vehicle electronics by the renewed action of one of the microswitches and corresponding switching operations are triggered.

Advantageously, the short leg of the rotating switching element carries a support pin on the front side and the opposite side, wherein the front-side support pin meshes in a corresponding support borehole of the housing and the opposite support pin into a corresponding support borehole of the carrier. By means of this two-point support of the rotating switching element, a reliable mode of functioning of the rotating switching element is attained.

According to another advantageous embodiment of the invention, the sliding switching element has a recess for an actuation projection of the switch lever. Appropriately, the recess is designed in the shape of an elongated hole and is connected with a horizontal bridge of the sliding switching element. The arrangement of the actuation projection in the recess is the mechanical connection between the switch lever and the sliding switching element. Since the switch lever is supported by a Cardan joint, but the position of the sliding switching element is to change only in a swivel direction, the opening is designed in the shape of an elongated hole. During the swivel movement of the switch lever for the actuation of the rotating switching element, the actuation projection follows the longitudinal orientation of the elongated hole and there is no action of the sliding switching element. If the switch lever swivels, in an arbitrary position, perpendicular to the first swiveling movement, the actuation projection moves the sliding switching element from its position at rest.

To carry out the related switching functions, the sliding switching element is appropriately provided with switching contacts, which are situated perpendicular to the recess and designed as contact arms; the contacts work together with correlated contact tracks of the corresponding leg of the carrier. The contact arms are, in turn, components of a pressed screen, injected into the sliding switching element.

The blinker switch and the wiper/washer switch are preferably correlated to a common circuit board, which is connected with a vehicle power supply.

Appropriately, the circuit board is provided with boreholes for the terminal contacts of the blinker switch and the wiper/washer switch. Thus, the number of supply lines of the vehicle power supply or the electronics to the switches is reduced and the vehicle electronics connected with the circuit board, which manage other switching functions correlated to the circuit board, have access to the functions of the two switches. Moreover, the insertion of the terminal contacts into the corresponding boreholes of the circuit board creates a fixing, which facilitates the electrical connection.

DETAILED DESCRIPTION OF THE PREFERRED EMBODIMENTS

Figure 1:
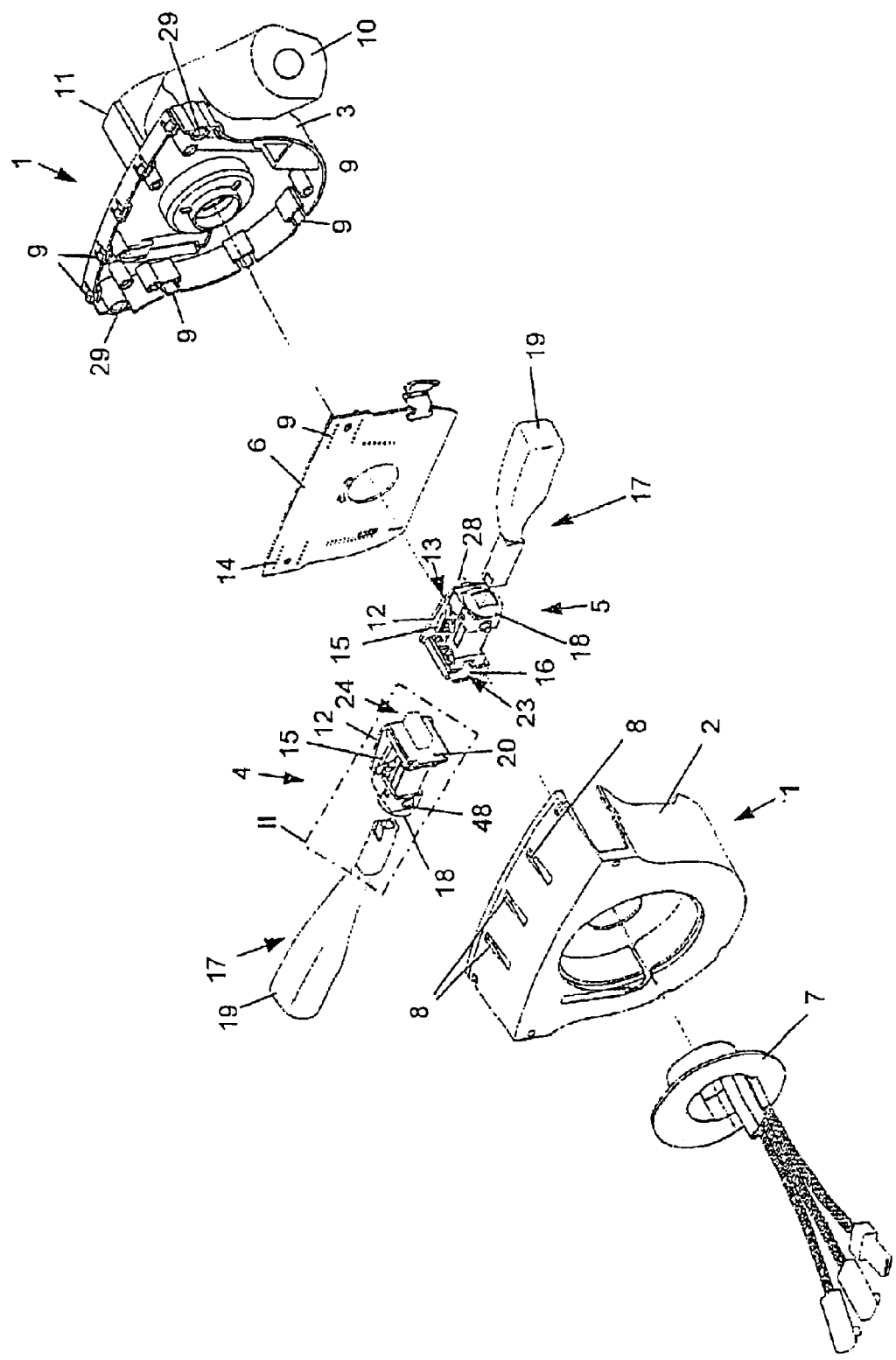
FIG. 1 is an exploded view of a steering column switch, in accordance with the invention.
Figure 2:
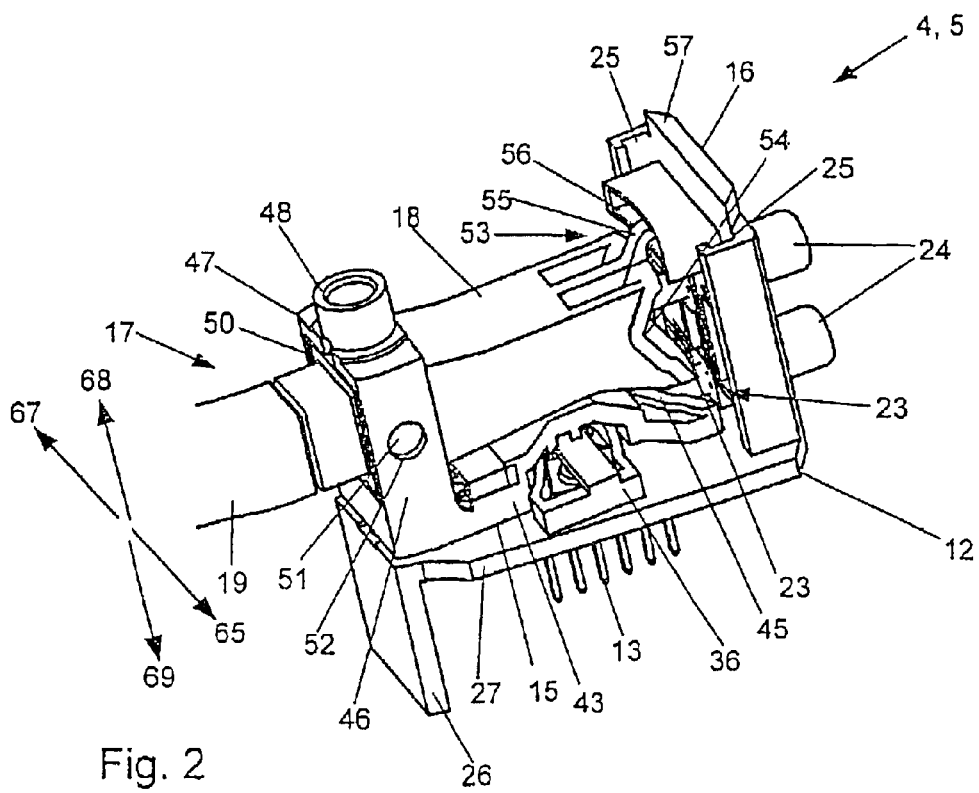
FIG. 2, an enlarged representation of detail II according to FIG. 1.
Figure 3:
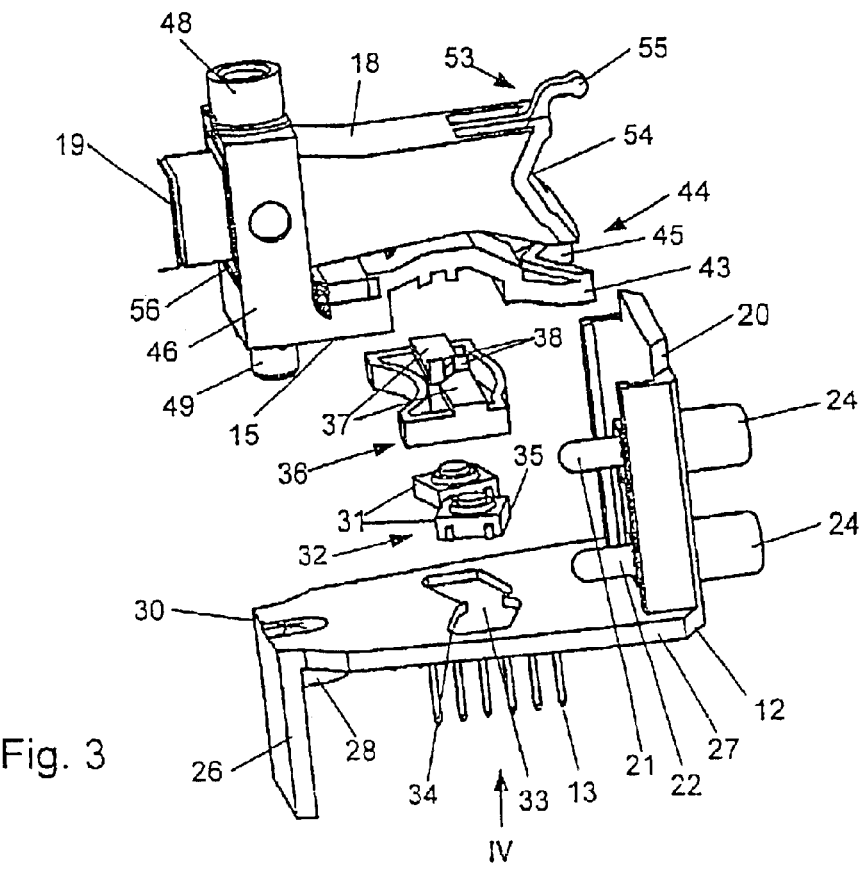
FIG. 3 is an exploded view of the assembly of FIG. 2.
Figure 4:
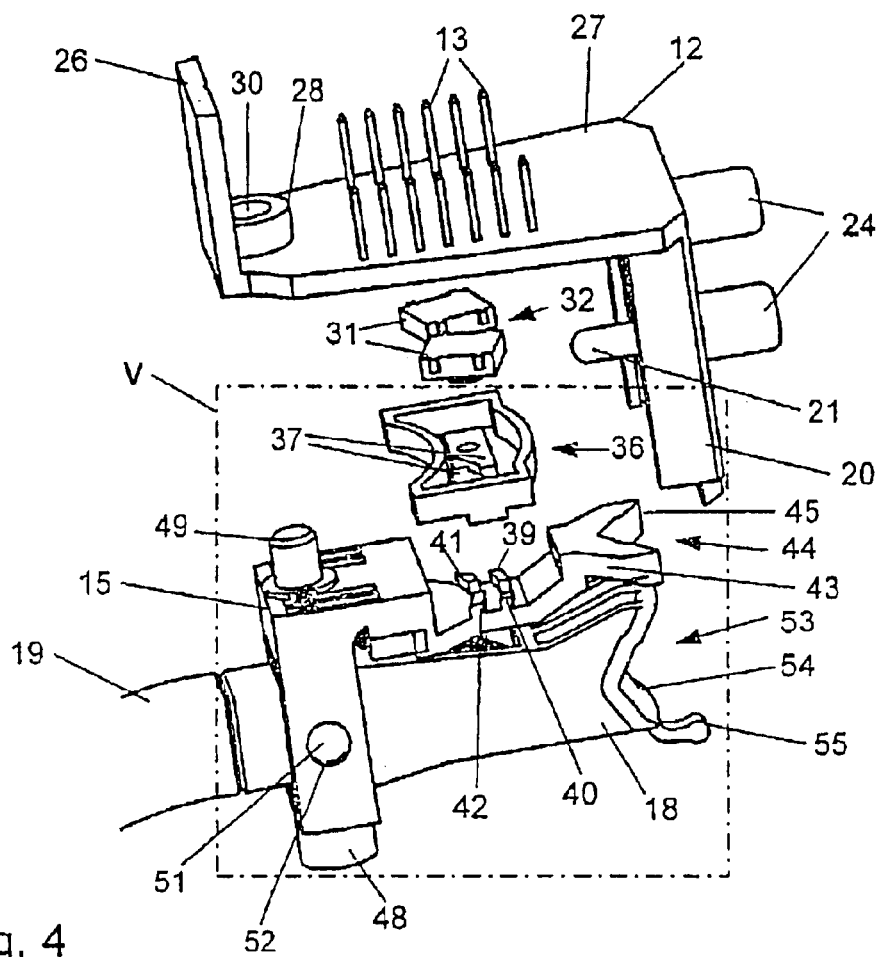
FIG. 4, a representation of the view in the direction of the arrow IV according to FIG. 3.
Figure 5:
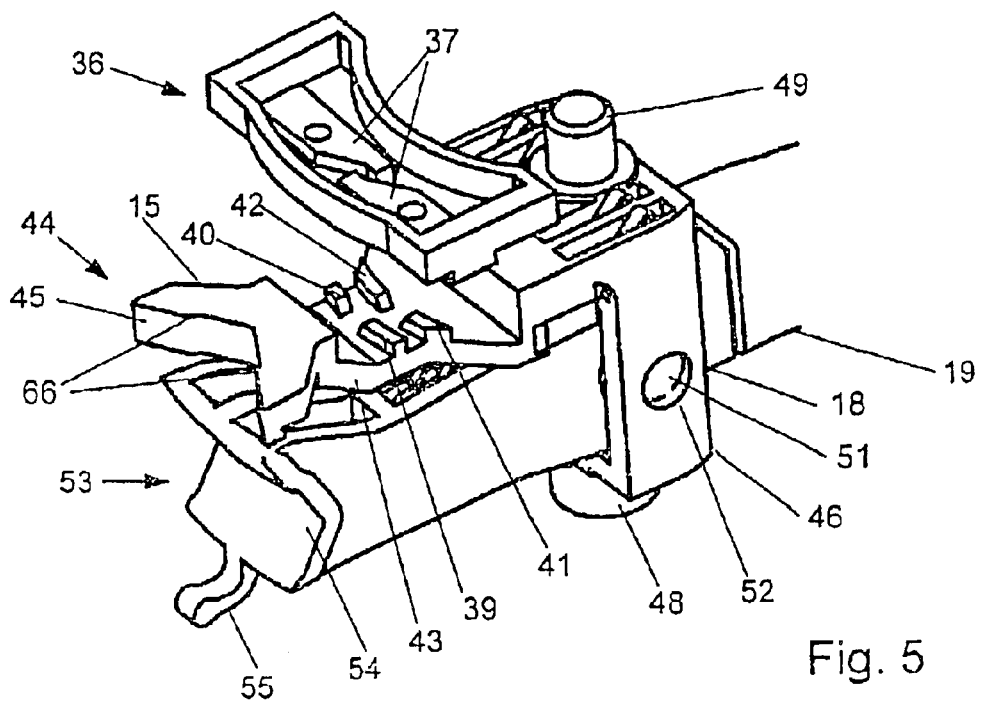
FIG. 5, an enlarged representation of detail V according to FIG. 4.
Figure 6:
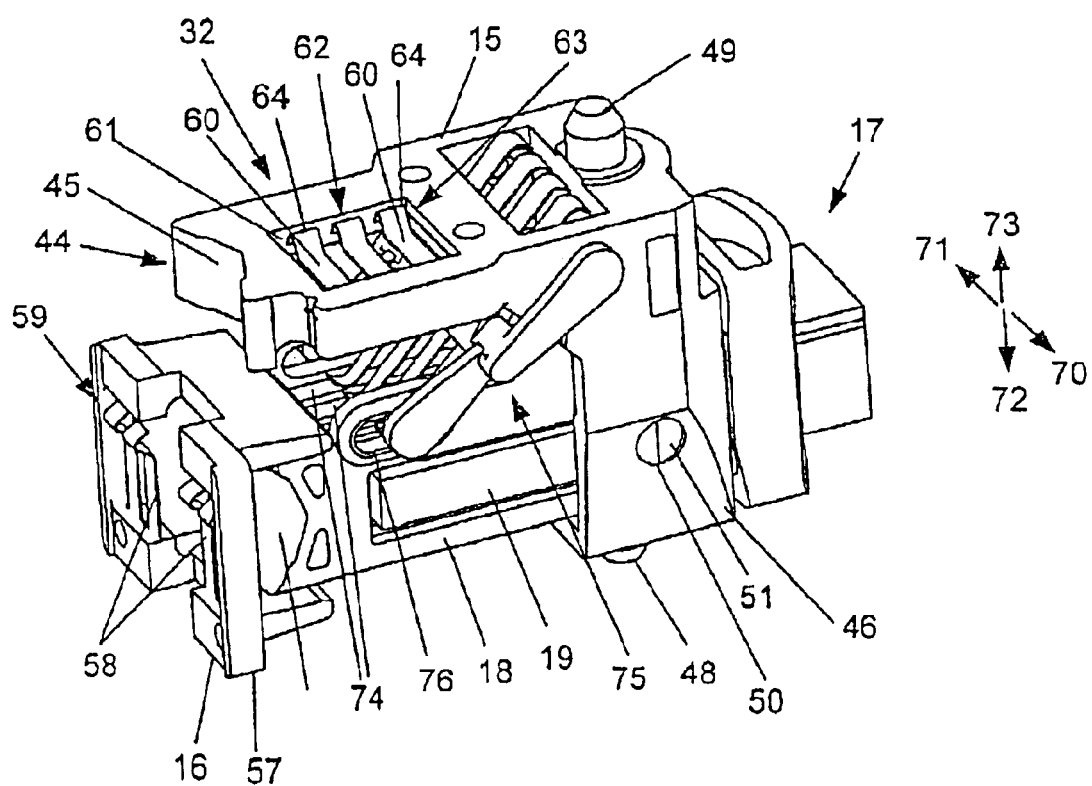
FIG. 6, an enlarged representation of detail V according to FIG. 4 in an alternative development.

The steering column switch comprises a two-part housing 1, which consists of a cover 2 and a carrier module 3 and holds a blinker switch 4 and a wiper/washer switch 5 with a correlated circuit board 6. A transmission element 7 for controlling the functions of an airbag is inserted into the cover 2 of the housing 1, on the side facing a steering wheel, which is not depicted and said housing is connected with the circuit board 6. On its circumference, the cover 2 is provided with clip openings 8, which enter into clip connections with corresponding clip arms 9 of the carrier module 3. Moreover, the carrier module 3 comprises an opening 10 for an ignition lock and an affixing device 11 for the fixing of the steering column switch to a steering column jacket of the vehicle.

The blinker switch 4 and the wiper/washer switch 5 are built identically and essentially consist of a carrier 12 with terminal contacts 13, which mesh into corresponding boreholes 14 of the circuit board 6, a rotating 15 and sliding switching element 16 and a switch lever 17, supported by a universal joint. The switch lever 17 is constructed in two parts and consists of a foot 18 and a gripping element 19, wherein the foot 18 and the gripping element 19 are mechanically connected with one another.

The carrier 12 is essentially designed in the shape of a Z and holds, in the middle, two spring-loaded, locking sleeves 21, 22, which are components of the locking devices 23 of the switch 4 or 5 and which are above one another, in the leg 20 facing the switch lever 17. Moreover, domes 24 are shaped on the leg 20 of the carrier 12, into which corresponding compressed springs are inserted, which act on the locking sleeves 21, 22. Furthermore, the leg 20 has opposite grooves 25 to guide the sliding switching element 16 and contact tracks, which are not depicted.

The second leg 26 of the carrier 12 is fixed in the carrier module 3 of the housing 1. The leg 20, 26-connecting bridge 27 comprises a shaped centering projection 28, in the area of the leg 26, which meshes into a corresponding recess 29 of the carrier module 3 and a support borehole 30 for the support of the rotating switching element 15, which is admitted into the centering projection 28. Furthermore, the terminal contacts 13 and switching contacts 32, designed as microswitches 31, are connected with the bridge 27. In order to fix the microswitches 31 in a defined position, an opening 33 is formed in the bridge 27, whose inside contour 34 corresponds to the outside contour 35 of the microswitches 31, which are situated next to one another.

An actuation device 36 with two spring arms 37 for the actuation of a microswitch 31 is located between the microswitches 31 and the essentially L-shaped rotating switching element 15, which extends parallel to the bridge 27 of the carrier. The free end of each spring arm 37 is provided with a boss 38, which works together with switching bosses 39, 40, 41, 42 of the rotating switching element 15, wherein the switching bosses 39, 40, 41, 42 are correlated with a long leg 43 of the rotating switching element 15. On its front side 44, facing the leg 20 of the carrier 12, the leg 43 of the rotating switching element 15 has a V-shaped locking curve 45, which is a component of one of the locking devices 23 and which works together with the lower locking sleeve 22.

In an alternative development of the rotating switching element 15 of the switch 4 or 5, the switching contacts 32 are correlated with the long leg 43 of the rotating switching element 15. The switching contacts 32 are designed as contact springs 60 and act together with contact tracks in the bridge 27 of the carrier 12, which are not depicted. The contact springs 60 protrude into a recess 61 of the leg 43 and are provided with a V-shaped bend 63 on their free ends 62, whose tip 64 acts on the correlated contact track.

The short leg 46 of the rotating switching element 15 comprises a support pin 48, 49, shaped on the front side 47 and the opposite side, wherein the front-side support pin 48 meshes into a corresponding support borehole of the cover 2 of the housing 1 and the opposite support pin 49, into the support borehole 30 of the carrier 12. Moreover, an opening 50 is made in the short leg 46, into which the foot 18 of the switch lever 16 is inserted in such a way that it can move by swiveling. In addition, the foot 18 has lateral axle pins 51, which are supported in corresponding boreholes 52 of the leg 46.

Moreover, the foot 18 of the switch lever 16 comprises a V-shaped locking curve 54, on its free end 53, facing the leg 20 of the carrier 12, with this curve working together with the upper locking sleeve 21, and an actuation projection 55, which acts on the sliding switching element 16. The actuation projection 55 meshes into an elongated hole-shaped recess 56 of a horizontal bridge 57 of the sliding switching element 16. The elongated hole-shaped formation of the recess 56 makes possible a swiveling of the switch lever 17 around the support pins 48, 49, without the sliding switching element 16 being moved and at the same time, secures the movement of the sliding switching element 16 into the groove 25 of the leg 20 of the carrier 12 with a swiveling movement of the switch lever 17 around the axle pin 51. By the interaction of the locking sleeve 21 with the locking curve 54 of the switch lever 17, the switch lever is held in a middle position, wherein the sliding switching element 16 assumes an equivalent position. Switching contacts 59, which are designed as contact arms 58, are correlated with the sliding switching element 16; they run perpendicular to the recess 56 and work together with the contact tracks in the leg 20 of the carrier 12.

Below, the mode of functioning of the keyed blinker switch 4 is explained, wherein, the microswitches 31 are provided as switching contacts 32. During the swivel movement of the switch lever 17 from the neutral position, in the direction of the arrow 65, the switching boss 42 reaches the correlated boss 38 and moves the spring arm 37 of the actuation device 36 in the direction of the corresponding microswitch 31, after whose actuation, the vehicle electronics receives a signal. This signal, which pre-sets the direction of the blinking, is stored and simultaneously triggers a change-of-lane blinking of the left blinking light. After the release of the switch lever, it swivels from the pertinent locking device 23, and is guided back to its neutral position.

If the switch lever 17 is swiveled over a threshold 66 of the locking curve 45, in the direction of the arrow 65, the microswitch 31 in the vehicle electronics, which is first actuated via the switching boss 42, sets a signal for the direction of the blinking. The microswitch 31, acted on subsequently by the switching boss 40, brings about a continuous blinking of the left blinking light, controlled by the vehicle electronics, after the release of the switch lever 17. The continuous blinking is ended by an electronic angle measurement device or by a swiveling of the switch lever 17 in the direction of the arrow 67. The blinking to the right is triggered by the swiveling of the switch lever 17, in the direction of the arrow 67, wherein the switch contact 39 first acts on the correlated microswitch 31 for a direction indication or change-of-lane blinking, which can be stored in the vehicle electronics. After exceeding the threshold 65 of the locking curve 45, the continuous blinking of the right blinking light begins, which is ended either by an electronic angle measurement device or by a swiveling of the switch lever 17, in the direction of the arrow 65.

If the switch lever 17 is swiveled around the axle pin 51, in the direction of the arrow 68, a movement of the sliding switching element 16 in the opposite direction by the actuation projection 55, inserted into the recess 56 of the sliding switch element 16, occurs, wherein the contact arms 58, in interplay with the corresponding contact tracks of the carrier 12, trigger the headlight flasher of the motor vehicle via the vehicle electronics. The swiveling of the switch lever 17 in the direction of the arrow 69 results in the switching on of the full beam, controlled by the vehicle electronics, after a corresponding linear movement of the sliding switching element 16. The switching off of the full beam occurs after the renewed swiveling of the switch lever 17, in the direction of the arrow 69, since in this way, the signal set in the vehicle electronics is reset.

The mode of functioning of the keyed wiper/washer switch 5 is essentially equivalent to that of the blinker switch 4. If the actuation of the rotating switching element 15 takes place by the swiveling of the switch lever 17, in the direction of the arrow 70, then a first stage of the front wiping functions, which is an interval wiping, is activated by the vehicle electronics. After releasing the switch lever 17, the lever returns to its neutral position. The renewed, perhaps multiple actuation of the switch lever 17, in the direction of the arrow 70, brings about the activation of a next-higher or arbitrarily higher stage of the front wiping functions. The next-lower or an arbitrarily lower stage is attained by a one-time or multiple actuation of the switch lever in the direction of arrow 71. In order to switch off the front wiping functions, the switch lever 17 is moved, in the direction of the arrow 71, over the threshold 66 of the locking curve 44, which results in a corresponding resetting of the vehicle electronics. The signal giving to the vehicle electronics occurs through the working together of the contact springs 60 of the rotating switching element 15 with the correlated contact tracks in the bridge 27 of the carrier 12.

To activate the front wiping/washing functions or the rear wiping/washing functions, the switching lever 17 is swiveled in the direction of arrow 72 or in the direction of arrow 73, wherein an opposing movement of the sliding switching element 16 occurs with a corresponding signal giving to the vehicle electronics.

To carry out other switching functions which are integrated in the switch lever 17, the gripping element 19 has contact tracks 74, exposed at the end inserted into the foot 18; these tracks work together, via a contact spring unit 75, with contact tracks of the bridge 27 of the carrier 12. The contact spring unit 75 is, on the one hand, supported in opposite elongated holes 76 of the foot 18 of the switch lever 17 and, on the other hand, in the rotating switching element 15.

REFERENCE SYMBOL LIST

1 Housing
2 Cover
3 Carrier module
4 Blinker switch
5 Wiper/washer switch
6 Circuit board
7 Transmission element 8 Clip opening
9 Clip arm
10 Hole
11 Affixing device
12 Carrier
13 Terminal contact
14 Borehole
15 Rotating switching element
16 Sliding switching element
17 Switch lever
18 Foot
19 Gripping element
20 Leg
21 Locking sleeve
22 Locking sleeve
23 Locking devices
24 Dome
25 Groove
26 Leg
27 Bridge
28 Centering projection
29 Recess
30 Support borehole
31 Microswitch
32 Switching contact
33 Opening
34 Inside contour
35 Outside contour
36 Actuation device
37 Spring arm
38 Boss
39 Switching boss
40 Switching boss
41 Switching boss
42 Switching boss
43 Leg
44 Frontside
45 Locking curve
46 Leg
47 Front side
48 Support pin
49 Support pin
50 Opening
51 Axle pin
52 Borehole
53 End
54 Locking curve
55 Actuation projection
56 Recess
57 Bridge
58 Contact arm
59 Switching contact
60 Contact spring
61 Recess
62 End
63 Bend
64 Tip
65 Arrow
66 Threshold
67 Arrow
68 Arrow
69 Arrow
70 Arrow
71 Arrow
72 Arrow
73 Arrow
74 Contact track
75 Contact spring unit
76 Elongated hole

What is claimed is:

1. Steering column switch, comprising:
a keyed blinker switch, and
a keyed wiper/washer switch, a common housing for housing both the keyed blinker switch and the keyed wiper/washer switch,
wherein each switch includes a switch lever coupled to a universal joint and engaged with a rotating switching element and sliding switching element, a carrier, wherein the switch lever, the rotating switching element and sliding switching element, the carrier of each switch are designed identically, and wherein the carrier of each switch is essentially shaped in the form of a Z having first and second legs joined by a bridge, wherein the first leg is used to engage the sliding switching element; the second leg is engaged by the housing; and the bridge supports the rotating switching element.

2. Steering column switch according to claim 1, wherein the first leg of the carrier, guiding the rotating switching element includes at least a first locking sleeve adapted to engage a locking member of the switch lever.

3. Steering column switch according to claim 2, wherein the first leg of a carrier guiding the rotating switching element includes at least a first and second locking sleeve, wherein said second locking sleeve is adapted to engage a locking member of the rotating switching element.

4. Steering column switch according to claim 2, wherein said locking member is designed in the shape of a V.

5. Steering column switch according to claim 1, wherein the rotating switching element is constructed in the shape of an L, wherein in the respectively associated switch lever is inserted in the second leg in such a way that it can move by swiveling, and the first leg is supported in the respectively associated carrier.

6. Steering column switch according to claim 5, wherein the first leg of the rotating switching element has switching contacts, designed as contact springs, for the contacting of correlated contact tracks of the bridge of the respectively associated carrier.

7. Steering column switch according to claim 6, wherein the first leg of the rotating switching element includes a recess, into which the carrier springs protrude.

8. Steering column switch according to claim 7, wherein the carrier springs are affixed on one side of the recess and are provided, on a free end, with a V-shaped bend, whose tip acts on the correlated contact track.

9. Steering column switch according to claim 5, further including an actuation device for switch contacts is correlated with the first leg of the rotating switching element, wherein said switch contacts are situated on the bridge of the carrier.

10. Steering column switch according to claim 9, wherein the actuation device includes two spring arms for acting on said switch contacts, wherein the free end of each spring arm carries a boss, which works together with switch bosses of the rotating switching element.

11. Steering column switch according to claim 5, wherein the second leg of the rotating switching element carries a support pin, wherein the support pin meshes into a corresponding support borehole of at least one of the housing and the carrier.

12. Steering column switch according to claim 1, wherein the sliding switching element includes a recess for an actuation projection of the respectively associated switch lever.

13. Steering column switch according to claim 12, wherein the recess is designed in the shape of an elongated hole and is correlated with a horizontal bridge of the sliding switching element.

14. Steering column switch according to claim 13, wherein the sliding switching element is provided with switching contacts situated perpendicular to the recess and designed as contact arms, which work together with correlated contact tracks of the corresponding first leg of the carrier.

15. Steering column switch according to claim 1, wherein the blinker switch and the wiper/washer switch are correlated with a common circuit board which is connected to a power supply of the motor vehicle.

16. Steering column switch according to claim 14, wherein the circuit board is provided with boreholes for one or more terminal contacts of the blinker switch and one or more terminal contacts of the wiper/washer switch.

* * * * *